United States Patent Office 3,277,044
Patented Oct. 4, 1966

3,277,044
PROCESS FOR STABILIZING HIGH MOLECULAR POLYOXYMETHYLENES
Klaus Weissermel and Hans Dieter Hermann, Frankfurt am Main, Claus Heuck, Hofheim, Taunus, Klaus Kullmar and Otto Mauz, Frankfurt am Main, and Manfred Reiher and Jakob Winter, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Jan. 23, 1961, Ser. No. 83,883
Claims priority, application Germany, Jan. 21, 1960, F 30,353
2 Claims. (Cl. 260—45.8)

The present invention relates to a process for stabilizing high molecular polyoxymethylenes.

It is known that many highly polymeric substances undergo degradation in the presence of oxygen and at higher temperatures, whereby the physical properties of the starting products, for example the strength, elongation and elasticity may diminish to an extent such that the products can no longer be used in industry. In order to avoid such a degradation, suitable stabilizers must be developed for each plastic material.

The present invention is concerned with a process for avoiding the degradation due to the action of oxygen of high molecular polyoxymethylenes by using certain sulfur-containing organic compounds.

By the term "high molecular polyoxymethylenes" there are to be understood all polymers composed of a plurality of [—O.CH$_2$—] structural units, independent of the nature of the terminal groups, since the properties of the high molecular polyoxymethylenes are predominantly determined by the structure of the macromolecular chains and only to a minor extent by the terminal groups. The high molecular polyoxymethylenes of this invention comprise, for example, those carrying terminal hydroxyl groups, ester groups or ether groups. The reduced viscosity of the high molecular polyoxymethylenes should be at least 0.3 and preferably 0.5–2.0, determined at 140° C. with a 0.5% by weight solution of the polyoxymethylene in butyrolactone containing 2% by weight of diphenylamine.

The high molecular polyoxymethylenes to which the process of this invention is applicable can be prepared in any desired manner, preferably by mass polymerization of trioxane, whereby crystalline and high molecular weight polymers are obtained.

Said polymers are suitably stabilized prior to or during their processing. This involves:

(1) Stabilization of terminal groups,
(2) Thermostabilization,
(3) Oxidation stabilization,
(4) Light stabilization.

The terminal groups can be stabilized, for example, by acylation with carboxylic anhydrides, such as acetic anhydride, in the presence of an alkali metal acetate or an organic base as esterification catalyst. By such a step the thermostability of the polymer is improved, that is to say, degradation starting at the end of the chain is largely inhibited.

For thermostabilization there can be used, for example, dicarboxylic acid diamides, hydrazine, urea and thiourea derivatives. These stabilizers bind in suitable form the formaldehyde or the derivatives thereof, for example formic acid, set free under the action of heat. In the presence of thermostabilizers the degradation of the polymer which takes place very rapidly at any point of the macromolecule, for example under the action of acids, is largely avoided.

For the oxidation stabilization there have hitherto been used secondary and tertiary amines and phenols which largely inhibit the auto-oxidation which takes place particularly at higher temperatures and at any point of the macromolecule. In the course of the auto-oxidation, compounds are formed by the action of air which probably have a peroxidic nature and cause degradation of the macromolecule. The known oxidation stabilizers have the disadvantage that they are not sufficiently active, especially at high temperatures, to prevent the polymer from becoming brittle. Moreover, in the working up of high molecular polyoxymethylenes in the presence of the known stabilizers, strong discolorations and even decompositions of the polymer may occur.

It has now been found that the oxidation stabilization and thus the stability to ageing of high molecular polyoxymethylenes can be substantially improved by the addition of sulfur-containing organic compounds having the structures indicated below.

The measurement for the stability to ageing is the "brittle test" which is carried out under the conditions set forth below and characterizes the tendency to embrittlement of shaped bodies of high molecular polyoxymethylenes.

The stabilizers to be used in accordance with the present invention belong to three different classes of substances. The substances belonging to the first class correspond to the following formula

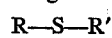

in which R represents a monovalent aliphatic hydrocarbon radical which contains 3 to 25 carbon atoms and may contain substituents such as alkyl, ester, ether, keto, amino, nitro, amide, nitrilo, hydroxy, or further sulfide and mercapto groups, a monovalent cycloaliphatic hydrocarbon radical or a monovalent aromatic hydrocarbon radical which may carry the same substituents as set forth above, and R' has the meaning given for R or stands for a hydrogen radical or an aliphatic hydrocarbon radical that is not identical with R and contains 1 to 25 carbon atoms and may contain substituents such as alkyl, ester, ether, keto, amino, nitro, amide, nitrilo, hydroxy, or further sulfide and mercapto groups, a cycloaliphatic or an aromatic radical which may carry the same substituents as set forth above.

Especially suitable are compounds in which R and R' are identical and contain ester groupings, for example the methyl, ethyl, butyl, octyl, cetyl dodecyl or octadecyl esters of thiodiglycollic acid, thiodipropionic acid, or thiodibutyric acid or the esters of sulfur-containing diols such as 4,4'-dihydroxydicyclo sulfide-distearic acid ester and 4,4'-dihydroxydiphenyl sulfide-dilauric acid ester or thiodiglycol-disalicylic acid esters, symmetrical aromatic sulfides such as bis-(4-hydroxyphenyl)-sulfide,
bis-(4-hydroxy-5-methylphenyl)-sulfide,
bis-(4-hydroxy-3,5-dimethylphenyl)-sulfide,
bis-(2-hydroxy-3-methyl-5-tertiary butylphenyl)-sulfide,
bis-(2-hydroxy-3-methyl-5-nonylphenyl)-sulfide,
bis-(1-hydroxynaphthyl)-sulfide(2),
bis-(2-hydroxy-naphthyl)-sulfide(1),
bis-2-hydroxy-3-nonylnaphthyl)-sulfide(1), symmetrical sulfides such as dioctyl sulfide, dioctadecyl sulfide, dicyclohexyl sulfide which may carry the substituents mentioned above.

Further well suitable compounds are compounds in which R and R' are not identical, especially compounds containing two sulfide groups such as 1,4-bis-(dodecylthio)-butane,
1,4-bis-(octadecylthio)-butane,
2,4-bis-(dodecylthio)-1,5-dimethylbenzene,
2,4-bis-(octadecyl-thiomethylene)-1,3,5-trimethyl-benzene,
2,4-bis-(dodecylthiomethylene)-1,5-dimethyl-benzene,
2,4-naphthalylene-bis-dodecyl-sulfide,
1,3-bis-(dodecylthiomethylene)-naphthalene,
tetra-(octadecylthio)-quinone;

furthermore asymmetrical sulfides which contain ester groups such as dodecylethylsulfide-2'-carboxylic acid dodecyl ester,
4-hydroxycyclohexyl-ethylsulfide-2'-carboxylic acid octadecyl ester,
2,4,6-trimethylphenyl-ethyl-sulfide-2'-carboxylic acid nonyl ester,
methylethyl-sulfide-2'-carboxylic acid dodecyl ester,
octadecyl-ethyl-sulfide-2'-carboxylic acid dodecyl ester,
methylethyl-sulfide-1-carboxylic acid octadecyl ester-2'-carboxylic acid dodecyl ester;

other asymmetrical sulfides and mercaptans such as dodecyl-mercaptan, methyl-octadecyl-sulfide, ω-mercaptobutyric acid dodecyl ester, 2-hydroxy-phenyl-octyl sulfide, thiophenol, which may likewise contain the above-mentioned substituents.

The second class of substances corresponds to the formula:

$$R—(S)_nR''$$

wherein the radicals R and R'' have the meanings given above for R and R' in the formula R—S—R', with the exception that R'' cannot represent a hydrogen radical. In the above formula $n$ stands for a whole number in the range from 2 to 4.

Especially suitable compounds of said class of substances are those which contain ester groupings, for example the methyl, octyl, dodecyl, cetyl, octadecyl esters of dimethyl-disulfide-1,1'-dicarboxylic acid,
dimethyl-trisulfide-1,1'-dicarboxylic acid,
diethyl-disulfide-2,2'-dicarboxylic acid,
diethyl-trisulfide-2,2'-dicarboxylic acid,
diethyl-tetrasulfide-2,2'-dicarboxylic acid,
diphenyl-disulfide-2,2'-dicarboxylic acid, or the esters of diols containing disulfide groups, such as dithioglycol-disalicyclic acid esters; furthermore amides of acids containing polysulfide groups, such as diphenyl-disulfide-2,2'-dicarboxylic acid-bis-(dibutyl-amide),
diphenyl-disulfide-2,2'-dicarboxylic acid-bis-(didocyl-amide),
diphenyl-disulfide-2,2'-dicarboxylic acid-bis-(4-hydroxy-phenyl-amide);

aromatic polysulfides such as bis-(2,4,6-trimethylbenzyl)-tetrasulfide,
bis-(4-hydroxyphenyl)-disulfide,
bis-(2-benzoylamino)-disulfide,
bis-(1-hydroxynaphthyl)-disulfide(2), and other polysulfides such as bis-octadecyl-disulfide, bis-octadecyl-trisulfide, bis-octadecyl-tetrasulfide, bis-(2-ureidoethyl)-disulfide, β-decahydro naphthyl-dodecyl-disulfide and polysulfides which contain the aforementioned substituents.

The substances belonging to the third class of substances have the general formula:

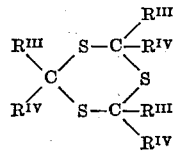

wherein $R^{III}$ stands for a hydrogen radical, or a monovalent aliphatic hydrocarbon radical containing up to 20 carbon atoms, $R^{IV}$ represents a hydrogen radical, a monovalent aliphatic hydrocarbon radical containing up to 20 carbon atoms or a monovalent aromatic hydrocarbon radical which may contain substituents such as ether, ester, alkyl keto, hydroxy, amino, nitrilo and halogen groups.

Especially suitable are unsubstituted trithiane (trithioformaldehyde) and trithianes containing aromatic substituents such as 2,4,6-tris-(4-hydroxy-3-methoxyphenyl)-trithiane,
2,4,6-tris-(2-methoxyphenyl)-trithiane,
2,4,6-tris-(3,4-methylene-dihydroxyphenyl)-trithiane,
2,4,6-tris-(2-hydroxyphenyl)-trithiane,
2,4,6-tris-(4-hydroxyphenyl)-trithiane,
2,4,6-tris-(2-hydroxy-5-chlorophenyl)-trithiane,
2,4,6-tris-(2-N-methylanilinophenyl)-trithiane, furthermore trithianes containing aliphatic substituents such as hexamethyltrithiane.

The compounds mentioned can be used either individually or in admixture with one another or, if desired, in admixture with known stabilizers.

Especially suitable for stabilizing high molecular polyoxymethylenes are, in view of the compatibility and workability, such sulfides or polysulfides or mercaptans as contain long chain aliphatic hydrocarbon radicals, for example octyl, dodecyl and octadecyl radicals.

The concentration or stabilizer required for improving the stability to ageing of high molecular polyoxymethylenes largely depends on the activity of the sulfide used. In general there are used about 0.001 to 5% by weight of stabilizer, calculated on the polymer.

The stabilizer or mixture of stabilizers is incorporated into the polymer by known methods, especially by methods which permit a uniform distribution of the stabilizer in the polymer in finely divided form.

For example the finely ground stabilizer can be incorporated into the high molecular polyoxymethylene in a dry mixer or on rollers. Alternatively, the stabilizer is dissolved in a solvent, the polymer is suspended in the solution, and the suspension is then evaporated to dryness. It is likewise possible to dissolve the stabilizer and the polymer and to precipitate the polymer containing the stabilizer either by cooling or by suitable precipitation agents. In some cases it may be especially advantageous to incorporate the stabilizer into the melt of the polymer.

The stability to ageing of the polymer is determined by the brittle test in which 0.5 mm. thick foils of high molecular polyoxymethylene are heated for 14 days at 105° C. and 120° C., respectively, in a drying cabinet with air circulation. The foils are then bent at room temperature, first by 180° and then in reverse direction by 360° in the same bend. The more bendings a foil can stand the more valuable it is.

The following table gives the test results obtained with high molecular polyoxymethylene produced from trioxane by a mass polymerization process.

The polymer was acetylized with acetic anhydride at 160° C. in the presence of traces of potassium acetate and stabilized with 1% by weight of malonic acid diamide (thermostabilizer).

After the incorporation of the sulfur-containing stabilizer foils having a thickness of 0.5 mm. were made from the polymer under the following conditions:

Preheating _____ 2 minutes at 190° C.
Pressing _____ 1 minute at 190° C. under a pressure of 100 kg./cm.²
Cooling _____ In a water-cooled press.

| Example No. | Type of stabilizer | Stabilizer concentration, percent by weight | Test after 14 days/105° C. | | | Test after 14 days/120° C. | | |
|---|---|---|---|---|---|---|---|---|
| | | | Loss of weight, percent by weight | Color | Brittle test | Loss of weight, percent by weight | Color | Brittle test |
| | 1st Group: Without Stabilizer | | | | | | | |
| 1 | | | 0.75 | Colorless | + | 1.15 | Colorless | — |
| | 2d Group: Known Stabilizers | | | | | | | |
| 2 | Bis[1-hydroxy-4-t-butyl-6-methyl-phenyl] methane. | 1.0 | 1.3 | ___do___ | ++ | 3.6 | ___do___ | — |
| 3 | Bis[2-hydroxy-3-t-butyl-5-methyl-phenyl] methane. | 1.0 | 2.2 | Slightly colored. | ++ | 3.7 | Colored | — |
| 4 | Bis[2,2'-hydroxy-naphthyl-]methane | 1.0 | 1.4 | Strongly colored. | ++ | 3.8 | Strongly colored. | — |
| | 3d Group: R—S—R' | | | | | | | |
| 5 | Thio-di-propionic acid didodecyl ester | 0.3 | 0.9 | Almost colorless. | ++ | 1.7 | Colorless | + |
| 6 | ___do___ | 0.5 | 0.6 | Colorless | ++ | 1.0 | ___do___ | + |
| 7 | ___do___ | 0.7 | 0.8 | Almost colorless. | ++ | 1.2 | ___do___ | + |
| 8 | ___do___ | 1.0 | 0.5 | Colorless | ++ | 1.4 | ___do___ | + |
| 9 | Thio-di-propionic acid dicetyl ester | 1.0 | 0.6 | ___do___ | ++ | 0.8 | ___do___ | + |
| 10 | Thio-di-propionic acid dioctadecyl ester | 1.0 | 0.7 | ___do___ | ++ | 0.8 | ___do___ | ++ |
| 11 | ___do___ | 0.6 | 0.7 | ___do___ | ++ | 0.8 | ___do___ | ++ |
| 12 | ___do___ | 0.8 | 0.4 | ___do___ | ++ | 0.7 | ___do___ | ++ |
| 13 | Thio-di-glycollic acid dioctadecyl ester | 1.0 | 0.4 | Slightly colored. | ++ | 0.45 | Slightly colored. | ++ |
| 14 | Thio-diglycollic acid-didodecyl ester | 1.0 | 0.7 | ___do___ | ++ | 1.2 | ___do___ | ++ |
| 15 | Thio-di-butyric acid dioctadecyl ester | 1.0 | 0.9 | ___do___ | ++ | 1.5 | ___do___ | + |
| 16 | 4.4'-dihydroxy-diphenylsulfide-didodecyl ester | 1.0 | 0.8 | Colorless | ++ | 0.9 | Colorless | + |
| 17 | ω-Mercapto-butyric acid-dodecyl ester | 1.0 | 1.0 | Almost colorless. | ++ | 1.7 | ___do___ | + |
| 18 | Thio-dodecyl-propionic acid-dodecyl ester | 1.0 | 0.9 | Colorless | ++ | 1.1 | ___do___ | + |
| 19 | 2.4-bis(dodecylthio)-1.5-dimethylbenzene | 1.0 | 2.3 | ___do___ | ++ | 2.4 | ___do___ | ++ |
| 20 | 2.4-naphthylene-bis-dodecylsulfide | 1.0 | 0.9 | ___do___ | ++ | 2.1 | ___do___ | + |
| 21 | 1.4-bis(dodecylmercapto)-butane | 1.0 | 1.1 | ___do___ | ++ | 1.3 | ___do___ | + |
| | 4th Group: R—(S)$_n$—R'' | | | | | | | |
| 22 | Dithioglycoldisalicylic acid ester | 1.0 | 1.0 | ___do___ | ++ | 2.0 | ___do___ | + |
| 23 | Diphenyldisulfide-2.2'-dicarboxylic acid di-octadecyl ester. | 1.0 | 1.0 | ___do___ | ++ | 1.1 | ___do___ | ++ |
| 24 | Diphenyldisulfide-2.2'-dicarboxylic acid di-N,N'-butyl-amide. | 1.0 | 1.7 | Yellowish | ++ | 1.7 | Yellowish | + |
| 25 | Diphenyldisulfide-2.2'-dicarboxylic acid di-N,N'-(4-oxyphenyl-amide). | 1.0 | 0.6 | ___do___ | ++ | 0.6 | ___do___ | + |
| 26 | Bis(2,4,6-trimethylbenzyl)-tetrasulfide | 1.0 | 1.1 | ___do___ | ++ | 1.3 | ___do___ | + |

5th Group

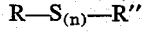

| 27 | Trithioformaldehyde | 1.0 | 0.8 | Colorless | + | 1.4 | Colorless | + |
| 28 | 2,4,6-tris(2-methoxyphenyl)trithiane | 1.0 | 0.7 | ___do___ | ++ | 0.9 | ___do___ | ++ |
| 29 | 2,4,6-tris(2-hydroxy-5-methylphenyl)trithiane | 1.0 | 1.0 | Reddish | ++ | 1.3 | Reddish | + |
| 30 | 2,4,6-tris(2-N-methylanilino-4-ethoxyphenyl)-trithiane. | 1.0 | 0.9 | Yellowish | ++ | 1.3 | Yellowish | + |

+ foil was not brittle and did not break after one bending cycle.
++ foil was not brittle, very tough, withstood at least 10 bending cycles.

—foil was brittle, broke after 1 bending cycle. 1 bending cycle comprised bending the foil by 180° and bending it in the bend in reverse direction by 360°.

*Evaluation of the test results given in the table*

(1) Foils of high molecular polyoxymethylenes that do not contain oxidation stabilizers become brittle after 14 days at 120° C., but not after 14 days at 105° C. (cf. group 1 of the table).

(2) Foils of high molecular polyoxymethylenes that are stabilized with known stabilizers likewise became brittle after having been kept for 14 days at 120° C. but are tougher after 14 days at 105° C. Most of the foils stored for 14 days at 105° C. or at 120° C. are strongly colored (cf. group 2 of the table).

(3) Foils of high molecular polyoxymethylenes that are stabilized with oxidation stabilizers of the general formula

R—S—R' do not become brittle after 14 days at either 105° C. or 120° C. and in most cases they remain colorless. Moreover these stabilizers seem to improve the thermostability of the polymers (compare group 3 with groups 1 and 2).

Especially active oxidation stabilizers are the compounds used in Examples 9, 14 and 19.

(4) Foils of high molecular polyoxymethylenes which are stabilized with oxidation stabilizers of the general formula:

R—S$_{(n)}$—R'' do not become brittle after 14 days at either 105° C. or 120° C. and in many cases they remain colorless. Especially effective is the stabilizer used in Example 23 which likewise possesses a favourable action on the thermostability of the polymer (cf. group 4 of the table).

(5) Foils of high molecular polyoxymethylenes which are stabilized with oxidation stabilizers of the general formula

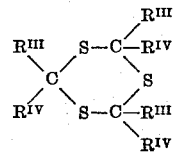

do not become brittle after having been stored for 14 days at 105° C. and 120° C., respectively.

The test results clearly show that the oxidation stabilizers of groups 3–5 considerably improve the stability to embrittlement of shaped bodies of high molecular polyoxymethylenes, and that they are far superior to the known anti-ageing agents.

The oxidation stabilizers used in accordance with the present invention are readily accessible by conventional methods of organic chemistry and represent well defined, mostly crystalline compounds. They are preferably used in the pure state.

The stabilized polyoxymethylenes of high molecular weight are of great importance in industry. They can be used for the manufacture of films, filaments, foils and shaped bodies by known methods.

We claim:
1. Oxidation-stabilized, high molecular weight polyoxymethylene which contains 0.001 to 5% by weight of a compound of the formula

$$R-S_n-R'$$

wherein $n$ is an integer from 1 to 4, R is a member selected from the group consisting of (a) alkyl of 1 to 18 carbon atoms, (b) cycloalkyl of 6 to 10 carbon atoms, (c) aryl, (d) lower alkylene or phenylene 1 to 18 carbon atom alkyl carboxylates, (e) saturated, linear fatty acid acyloxy phenyl, (f) saturated, linear fatty acid acyloxy cyclohexyl, (g) salicycloxyalkyl, (h) 1 to 18 carbon atom alkyl thio phenyl), (i) 1 to 18 carbon atom alkyl thio benzyl, (j) 1 to 18 carbon atom alkyl thio naphthyl, (k) 1 to 18 carbon atom alkyl thio alkyl, (l) hydroxy phenyl and naphthyl, (m) 1 to 9 carbon atom alkyl phenyl and naphthyl, (n) 1 to 12 carbon atom alkylamidophenyl, (o) hydroxyphenylamidophenyl, (p) alkylbenzyl, (q) hydroxybenzyl, (r) alkylthioquinonyl, (s) benzoylamino, and (t) ureidoalkyl; R' is a member selected from the group consisting of (aa) alkyl of 8 to 18 carbon atoms, (bb) cycloalkyl of 6 to 10 carbon atoms, (cc) lower alkylene or phenylene 1 to 18 carbon atom alkyl carboxylates, (dd) saturated, linear fatty acid acyloxy phenyl, (ee) saturated, linear fatty acid acyloxy cyclohexyl, (ff) salicyloxyalkyl, and (gg) hydroxycyclohexyl; R' also representing hydrogen when $n$ is 1.

2. Oxidation-stabilized, high molecular weight polyoxymethylene which contains 0.001 to 5% by weight of a compound selected from the group consisting of thiodipropionic acid didodecyl ester, thio-di-propionic acid dicetyl ester, thio-di-propionic acid dioctadecyl ester, thio-di-glycollic acid dioctadecyl ester, thio-di-glycollic acid didodecyl ester, thio-di-butyric acid dioctadecyl ester, 4,4'-dihydroxy-diphenylsulfide-didodecyl ester, omega-mercapto-butyric acid dodecyl ester, thio-dodecyl-propionic acid dodecyl ester, 2,4-bis-(dodecylthio)-1,5-dimethylbenzene, 2,4-naphthylene-bis-dodecylsulfide, 1,4-bis-(dodecylmercapto)-butane, dithioglycol-disalicylic acid ester, diphenyldisulfide-2,2'-dicarboxylic acid dioctadecyl ester, diphenyldisulfide-2,2'-dicarboxylic acid di-N,N'-butylamide, diphenyldisulfide-2,2'-dicarboxylic acid di-N,N'-(4-hydroxyphenylamide), bis(2,4,6-trimethylbenzyl)-tetrasulfide, trithioformaldehyde, 2,4,6-tris (2-methoxyphenyl) trithiane, 2,4,6-tris(2-hydroxy-5-methylphenyl) trithiane, and 2,4,6-tris (2-N-methylanilino-4-ethoxyphenyl)-trithiane.

References Cited by the Examiner
UNITED STATES PATENTS

| | | | |
|---|---|---|---|
| 2,376,354 | 5/1945 | Gresham | 260—45.9 |
| 2,514,625 | 7/1950 | Clausen et al. | 252—406 |
| 2,519,755 | 8/1950 | Gribbins et al. | 260—45.85 |
| 2,868,745 | 1/1959 | Canarios | 260—45.95 |
| 2,893,972 | 7/1959 | Kubico et al. | 260—45.8 |
| 2,920,059 | 1/1960 | MacDonald et al. | 260—45.8 |
| 2,985,617 | 5/1961 | Salyer et al. | 260—45.95 |
| 3,010,937 | 11/1961 | Roos et al. | 260—45.7 |
| 3,058,952 | 10/1962 | Dexheimer et al. | 260—45.8 |
| 3,131,165 | 4/1964 | Hermann et al. | 260—45.8 |

LEON J. BERCOVITZ, *Primary Examiner.*

ALFONSO D. SULLIVAN, DONALD E. CZAJA,
*Examiners.*

R. W. GRIFFIN, H. E. TAYLOR, *Assistant Examiners.*